(12) United States Patent
Kaufman et al.

(10) Patent No.: US 12,466,440 B2
(45) Date of Patent: *Nov. 11, 2025

(54) AUTONOMOUS VEHICLE HAILING AND PICKUP LOCATION REFINEMENT THROUGH USE OF AN IDENTIFIER

(71) Applicant: GM Cruise Holdings LLC, San Francisco, CA (US)

(72) Inventors: David Kaufman, San Francisco, CA (US); Keyur Patel, Livermore, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 18/478,987

(22) Filed: Sep. 29, 2023

(65) Prior Publication Data
US 2024/0028047 A1   Jan. 25, 2024

Related U.S. Application Data

(63) Continuation of application No. 17/555,432, filed on Dec. 18, 2021, now Pat. No. 11,809,197, which is a
(Continued)

(51) Int. Cl.
*B60W 60/00*   (2020.01)
*G05D 1/00*   (2024.01)
(Continued)

(52) U.S. Cl.
CPC .......... *B60W 60/00253* (2020.02); *B60W 60/00256* (2020.02); *G05D 1/0088* (2013.01);
(Continued)

(58) Field of Classification Search
CPC ...... B60W 60/00253; B60W 60/00256; G05D 1/247; G05D 1/0088; G05D 1/0212;
(Continued)

(56) References Cited

U.S. PATENT DOCUMENTS 6,334,697 B1 * 1/2002 Gappelberg ........ H01M 50/213
362/186
9,194,168 B1 * 11/2015 Lu ...................... G01C 21/3438
(Continued)

FOREIGN PATENT DOCUMENTS

CN   114008642 A   2/2002
CN   105676251 A   6/2016
(Continued)

OTHER PUBLICATIONS

"Communication Pursuant to Article 94(3) EPC for European Patent Application No. 19842552.2", Mailed Date: Feb. 15, 2024, 9 pages.
(Continued)

*Primary Examiner* — Dale W Hilgendorf
(74) *Attorney, Agent, or Firm* — Honigman LLP; Matthew H. Szalach; Jonathan P. O'Brien

(57) ABSTRACT

Technologies relating to an autonomous vehicle are described. The autonomous vehicle is configured to determine that a person is attempting to hail the autonomous vehicle through use of a passenger identifier. The autonomous vehicle identifies a passenger account associated with the passenger identifier being presented by the person, and responsive to identifying the passenger account, determines whether the autonomous vehicle should pick up the person.

15 Claims, 8 Drawing Sheets

Related U.S. Application Data continuation of application No. 16/368,780, filed on Mar. 28, 2019, now Pat. No. 11,269,353.

(51) Int. Cl.
| | |
|---|---|
| *G05D 1/229* | (2024.01) |
| *G05D 1/247* | (2024.01) |
| *G06K 7/14* | (2006.01) |
| *G06Q 10/02* | (2012.01) |
| *G06V 20/52* | (2022.01) |
| *G06V 20/56* | (2022.01) |
| *G06V 20/58* | (2022.01) |

(52) U.S. Cl.
CPC ......... *G05D 1/0212* (2013.01); *G05D 1/0231* (2013.01); *G05D 1/0276* (2013.01); *G05D 1/2297* (2024.01); *G05D 1/247* (2024.01); *G06V 20/53* (2022.01); *G06V 20/56* (2022.01); *G06V 20/58* (2022.01); *G06K 7/1417* (2013.01); *G06Q 10/02* (2013.01)

(58) Field of Classification Search
CPC .. G05D 1/0231; G05D 1/0276; G05D 1/2297; G06V 20/53; G06V 20/56; G06V 20/58; G06K 7/1417; G06Q 10/02
See application file for complete search history.

(56) References Cited

U.S. PATENT DOCUMENTS

| | | | | |
|---|---|---|---|---|
| 9,494,938 | B1* | 11/2016 | Kemler | B60Q 1/5035 |
| 10,029,787 | B1* | 7/2018 | Lesser | G06Q 10/0833 |
| 10,088,846 | B2 | 10/2018 | Gao et al. | |
| 10,272,827 | B1 | 4/2019 | Kemler et al. | |
| 10,317,897 | B1* | 6/2019 | Kentley-Klay | B60R 16/037 |
| 10,395,457 | B2 | 8/2019 | Cooley | |
| 10,605,613 | B2 | 3/2020 | Houston | |
| 10,726,360 | B2 | 7/2020 | Fujimoto | |
| 10,884,413 | B2 | 1/2021 | Iagnemma et al. | |
| 11,269,353 | B2* | 3/2022 | Kaufman | G05D 1/0231 |
| 11,645,629 | B2* | 5/2023 | Leary | H04W 4/40 |
| | | | | 701/538 |
| 11,676,236 | B2* | 6/2023 | Jiao | G01C 21/3623 |
| | | | | 701/23 |
| 11,809,196 | B2* | 11/2023 | Kaufman | G05D 1/0088 |
| 11,809,197 | B2* | 11/2023 | Kaufman | B60W 60/00256 |
| 2011/0052004 | A1 | 3/2011 | Lee et al. | |
| 2011/0195699 | A1* | 8/2011 | Tadayon | H04B 5/77 |
| | | | | 455/418 |
| 2012/0095790 | A1* | 4/2012 | Stefik | G07B 15/02 |
| | | | | 705/5 |
| 2014/0040079 | A1* | 2/2014 | Smirin | G06Q 30/0639 |
| | | | | 705/27.1 |
| 2014/0229258 | A1* | 8/2014 | Seriani | G06Q 30/08 |
| | | | | 705/14.23 |
| 2014/0300449 | A1* | 10/2014 | Kounavis | G08B 7/06 |
| | | | | 340/6.1 |
| 2015/0339928 | A1* | 11/2015 | Ramanujam | G06Q 10/00 |
| | | | | 701/23 |
| 2015/0346727 | A1 | 12/2015 | Ramanujam | |
| 2016/0098689 | A1* | 4/2016 | Bowles | G07F 7/06 |
| | | | | 705/23 |
| 2016/0161266 | A1* | 6/2016 | Crawford | G01C 21/34 |
| | | | | 701/25 |
| 2017/0126810 | A1 | 5/2017 | Kentley | G06Q 30/0601 |
| 2017/0153714 | A1* | 6/2017 | Gao | G05D 1/0088 |
| 2017/0191845 | A1* | 7/2017 | Marueli | H04L 67/12 |
| 2017/0249846 | A1* | 8/2017 | Ignaczak | G08G 1/005 |
| 2017/0277191 | A1* | 9/2017 | Fairfield | G08G 1/005 |
| 2017/0344010 | A1* | 11/2017 | Rander | G06Q 10/08 |
| 2018/0053412 | A1* | 2/2018 | Iagnemma | G05D 1/0088 |
| 2018/0058866 | A1 | 3/2018 | Houston | |
| 2018/0075754 | A1 | 3/2018 | Salter et al. | |
| 2018/0087915 | A1* | 3/2018 | Marco | G08G 1/202 |
| 2018/0129981 | A1 | 5/2018 | Fujimoto | |
| 2018/0196417 | A1* | 7/2018 | Iagnemma | G06Q 50/40 |
| 2018/0341274 | A1 | 11/2018 | Donnelly et al. | |
| 2019/0051069 | A1 | 2/2019 | Cooley | |
| 2019/0128694 | A1* | 5/2019 | Matsushita | G10L 13/00 |
| 2019/0318159 | A1* | 10/2019 | Blanc-Paques | G06Q 10/02 |
| 2020/0124428 | A1* | 4/2020 | Hamilton | G05D 1/0027 |
| 2020/0166366 | A1* | 5/2020 | Herman | G06V 20/56 |
| 2020/0254974 | A1* | 8/2020 | Gordon | B60R 25/25 |
| 2020/0272143 | A1 | 8/2020 | Scott et al. | |
| 2020/0310461 | A1 | 10/2020 | Kaufman et al. | |
| 2020/0406859 | A1* | 12/2020 | Hassani | G06F 21/32 |
| 2021/0224527 | A1* | 7/2021 | Meador | G06T 7/20 |
| 2022/0113738 | A1 | 4/2022 | Kaufman et al. | |
| 2022/0113739 | A1 | 4/2022 | Kaufman et al. | |
| 2022/0135077 | A1* | 5/2022 | Moon | B60W 60/0027 |
| | | | | 701/26 |
| 2024/0391501 | A1* | 11/2024 | Sharan | B60W 60/00256 |

FOREIGN PATENT DOCUMENTS

| | | |
|---|---|---|
| CN | 108885773 A | 11/2018 |
| CN | 114008642 B | 9/2022 |
| WO | 2020197605 A1 | 10/2020 |

OTHER PUBLICATIONS

"International Search Report for PCT Patent Application No. PCT/US2019/068692", Mailed Date: Mar. 27, 2020, 4 Pages.
"Written Opinion of the International Searching Authority for PCT Patent Application No. PCT/US2019/068692", Mailed Date: Mar. 27, 2020, 9 Pages.
"Non-Final Office Action for U.S. Appl. No. 16/368,780", Mailed Date: May 13, 2021, 37 Pages.
"Reply to Non-Final Office Action for U.S. Appl. No. 16/368,780", filed Aug. 12, 2021, 20 Pages.
"Final Office Action for U.S. Appl. No. 16/368,780", Mailed Date: Aug. 20, 2021, 35 Pages.
"Reply to Final Office Action for U.S. Appl. No. 16/368,780", filed Nov. 21, 2021, 13 Pages.
"International Preliminary Report on Patentability for PCT Patent Application No. PCT/US2019/068692", Mailed Date: Sep. 28, 2021, 10 Pages.
"Communication pursuant to Rules 161(1) and 162 EPC for European Patent Application No. 19842552.2", Mailed Date: Oct. 22, 2021, 3 Pages.
"Notice of Allowance and Fees Due for U.S. Appl. No. 16/368,780", Mailed Date: Dec. 16, 2021, 9 Pages.
"Corrected Notice of Allowability for U.S. Appl. No. 16/368,780", Mailed Date: Dec. 24, 2021, 2 pages.
"Notification of Examination Decision on PPH Request for Chinese Patent Application No. 201980096742.X", Mailed Date: Mar. 30, 2022, 2 pages.
"Request for Examination for Chinese Patent Application No. 201980096742.X", Filed Date: Jan. 25, 2022, 2 pages.
"Request for PPH Examination and Voluntary Amendment for Chinese Patent Application No. 201980096742.X", Filed Date: Mar. 16, 2022, 34 pages.
"Response to the Communication Pursuant to Rules 161(1) and 162 EPC for European Patent Application No. 19842552.2", Filed Date: Apr. 28, 2022, 29 pages.
"Office Action for Chinese Patent Application No. 201980096742.X", Mailed Date: May 11, 2022, 11 pages.
"Response to the Office Action for Chinese Patent Application No. 201980096742.X", Filed Date: Jun. 10, 2022, 24 pages.
"Notice of Allowance for Chinese Patent Application No. 201980096742.X", Mailed Date: Aug. 2, 2022, 4 pages.
"Office Action for U.S. Appl. No. 17/555,426", Mailed Date: Mar. 22, 2023, 13 pages.
"Response to the Office Action for U.S. Appl. No. 17/555,426", filed Jun. 26, 2023, 12 pages.
"Notice of Allowance and Fees Due for U.S. Appl. No. 17/555,426", Mailed Date: Jul. 17, 2023, 8 pages.

(56) References Cited

OTHER PUBLICATIONS

"Notice of Allowance and Fees Due for U.S. Appl. No. 17/555,432", Mailed Date: Jul. 17, 2023, 8 pages.
"Office Action for U.S. Appl. No. 17/555,432", Mailed Date: Apr. 13, 2023, 14 pages.
"Response to the Office Action for U.S. Appl. No. 17/555,432", filed Jun. 26, 2023, 11 pages.

* cited by examiner

AUTONOMOUS VEHICLE HAILING AND PICKUP LOCATION REFINEMENT THROUGH USE OF AN IDENTIFIER

CROSS-REFERENCE TO RELATED APPLICATION

This application is a continuation of U.S. patent application Ser. No. 17/555,432, now U.S. Pat. No. 11,809,197, filed on Dec. 18, 2021, and entitled "AUTONOMOUS VEHICLE HAILING AND PICKUP LOCATION REFINEMENT THROUGH USE OF AN IDENTIFIER", which is a continuation of U.S. Pat. No. 11,269,353, filed on Mar. 28, 2019, and entitled "AUTONOMOUS VEHICLE HAILING AND PICKUP LOCATION REFINEMENT THROUGH USE OF AN IDENTIFIER", the entireties of which are incorporated herein by reference.

BACKGROUND

An autonomous vehicle is a vehicle that is able to operate without a human driver (e.g., without a human driver sitting in the vehicle and controlling the vehicle). An exemplary autonomous vehicle can include: 1) several sensors of different types; 2) a computing system; and 3) mechanical systems (such as a propulsion system, a braking system, a steering system, etc.). The sensors output sensor signals, the computing system receives and processes the sensor signals, and the computing system controls the mechanical systems based upon the sensor signals. Exemplary sensors include, but are not limited to, a lidar sensor, a radar sensor, an image sensor (e.g., a video camera), an infrared sensor, a sonar sensor, amongst others. The computing system can process the sensor signals to identify objects represented in the sensor signals (e.g., pedestrians, bicycles, cars, trucks, traffic barrels, etc.), track movement of objects represented in the sensor signals, predict future locations of moving objects, and so forth.

Autonomous vehicles may be used in ride-sharing scenarios; thus, a person can hail an autonomous vehicle for a ride. According to an illustration, the person can hail an autonomous vehicle by requesting a ride through a mobile application executing on a mobile computing device of the person. Pursuant to various examples, the person can specify a pickup location for the ride or the pickup location for the ride can be determined based on a current location of the mobile computing device. For example, the person can enter the pickup location for the ride (e.g., by entering an address, intersection, point of interest, etc.) into the mobile application. Pursuant to another example, the current location of the mobile computing device can be detected by the mobile computing device (e.g., using a Global Positioning System (GPS) sensor of the mobile computing device); following this example, the current location of the mobile computing device can be set as the pickup location for the ride. Accordingly, information specifying the pickup location as well as an identity of the person and a destination location for the ride can be transmitted to a server computing system as part of the request for the ride. The server computing system can assign an autonomous vehicle for the ride (e.g., the autonomous vehicle can be selected based on proximity to the pickup location).

Most of the time, this approach for hailing a ride is adequate; however, in some situations, pinpointing an exact pickup location of a person can be difficult. For instance, if the person is being picked up at a football stadium, the potential locations of the person are numerous and there may be many potential passengers in a small region, therefore, it may be difficult for the autonomous vehicle to identify the person from amongst all of the potential passengers. In yet another example, the person may not have a mobile computing device or the mobile computing device may be out of battery or not have service. In conventional scenarios where a person wishes to hail an autonomous vehicle for a ride, the autonomous vehicle is unable to ascertain that the person desires a ride, as the person must initiate the application on his or her mobile computing device, which in turn informs the server computing system that the person desires a ride (and also informs the server computing system of the location of the person).

SUMMARY

The following is a brief summary of subject matter that is described in greater detail herein. This summary is not intended to be limiting as to the scope of the claims.

Described herein are various technologies pertaining to autonomous vehicles. More particularly, described herein are technologies relating to determining that a person is using a passenger identifier to hail a ride from an autonomous vehicle, identifying the passenger identifier from amongst a plurality of potential passenger identifiers, and identifying a passenger account for the person based on the passenger identifier. For example, the passenger account may comprise demographic information for the person, payment information for the person (e.g., a credit card of the person that is to be charged), a history of rides taken by the person, trip preferences of the person (e.g., take highways only, take scenic routes only, etc.), among other possible information. With respect to the passenger identifier, such identifier can be a barcode (e.g., shown on a display of a mobile computing device of the person, printed and affixed to a back of the mobile computing device of the person), a specific color (e.g., on a piece of paper, shown on the display of the mobile computing device), a sequence of graphics shown on the display of the mobile computing device, data in a BLUETOOTH signal emitted by the mobile computing device, etc. The passenger identifier can be used by the autonomous vehicle to identify the person (and therefore the location of the person) who is hailing a ride or who has previously hailed a ride and is attempting to inform the autonomous vehicle of the current location of the person.

The autonomous vehicle includes a plurality of sensors, where the sensors can include a lidar sensor, a radar sensor, and an image sensor (e.g., a video camera). The sensors generate sensor signals that are indicative of surroundings of the autonomous vehicle. The autonomous vehicle further includes a computing system that processes the sensor signals to identify and track objects in the surroundings of the autonomous vehicle as the autonomous vehicle is traveling along roadways. The computing system can determine, based upon a sensor signal output by a sensor, that a person may be attempting to hail a ride from the autonomous vehicle. For instance, the computing system can determine, based upon the sensor signal and further based upon a computer-implemented map of a geographic region in which the autonomous vehicle is traveling, that the person is presenting a passenger identifier (e.g., the person is holding his or her mobile telephone in the air, and the passenger identifier is displayed on the display of the mobile telephone). Further, based upon the sensor signal, the computing system can ascertain that the person is hailing a ride or that the person is identifying himself/herself to the autonomous vehicle when the person has already hailed the ride.

Responsive to determining that the person is potentially presenting the passenger identifier, either to start a ride or flag down an autonomous vehicle that the person has already requested through the application, the computing system can cause the autonomous vehicle to decrease its velocity, thereby providing additional time for the autonomous vehicle to identify the passenger identifier being presented by the person. While the velocity of the autonomous vehicle is decreased, the computing system receives the sensor signal(s) and identifies the passenger identifier. Specifically, the computing system can identify a barcode, detect a graphic, and so forth based upon the sensor signal(s).

Responsive to the autonomous vehicle identifying the passenger identifier, the autonomous vehicle transmits identifying data to the server computing system (wherein the identifying data is determined by the autonomous vehicle based upon the passenger identifier), and the server computing system can search a data store to identify a passenger account that is assigned to the identifying data (and is thus assigned to the passenger identifier). In another exemplary embodiment, when the person has already hailed a ride, the autonomous vehicle can already have passenger account information stored in computer-readable storage on the autonomous vehicle and can identify that the person corresponds to the passenger account information based upon the passenger identifier.

For instance, the person may have requested the ride and input his pickup location as a basketball arena; such a large geographic space provides a plethora of potential pickup locations. To help the autonomous vehicle identify the person (and thus the pickup location for the passenger), the passenger presents his or her mobile telephone, which displays a barcode that can be read by the autonomous vehicle. The autonomous vehicle detects the barcode based upon sensor signal(s) output by the sensors of the autonomous vehicle, decodes the barcode (to generate identifying data), and then confirms that the person associated with that barcode is the person that the autonomous vehicle is meant to pick up.

In another example, the person may not have ordered a ride through the application (e.g., the person's mobile telephone is dead, or the person's mobile telephone does not get service). The person leaves the basketball arena and presents his or her mobile telephone to an autonomous vehicle that is not currently providing a ride, is not in route to pick up a person who has hailed a ride, and/or which lacks capacity for the person (e.g., the autonomous vehicle already has several riders). The autonomous vehicle can detect the passenger identifier for the person from among the other visual stimuli in the surrounding environment based upon a sensor system output by a sensor of the autonomous vehicle. The computing system of the autonomous vehicle can identify a passenger account based upon the passenger identifier, and the autonomous vehicle may then stop to pick up the person and transport the person to a destination location indicated by the person.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
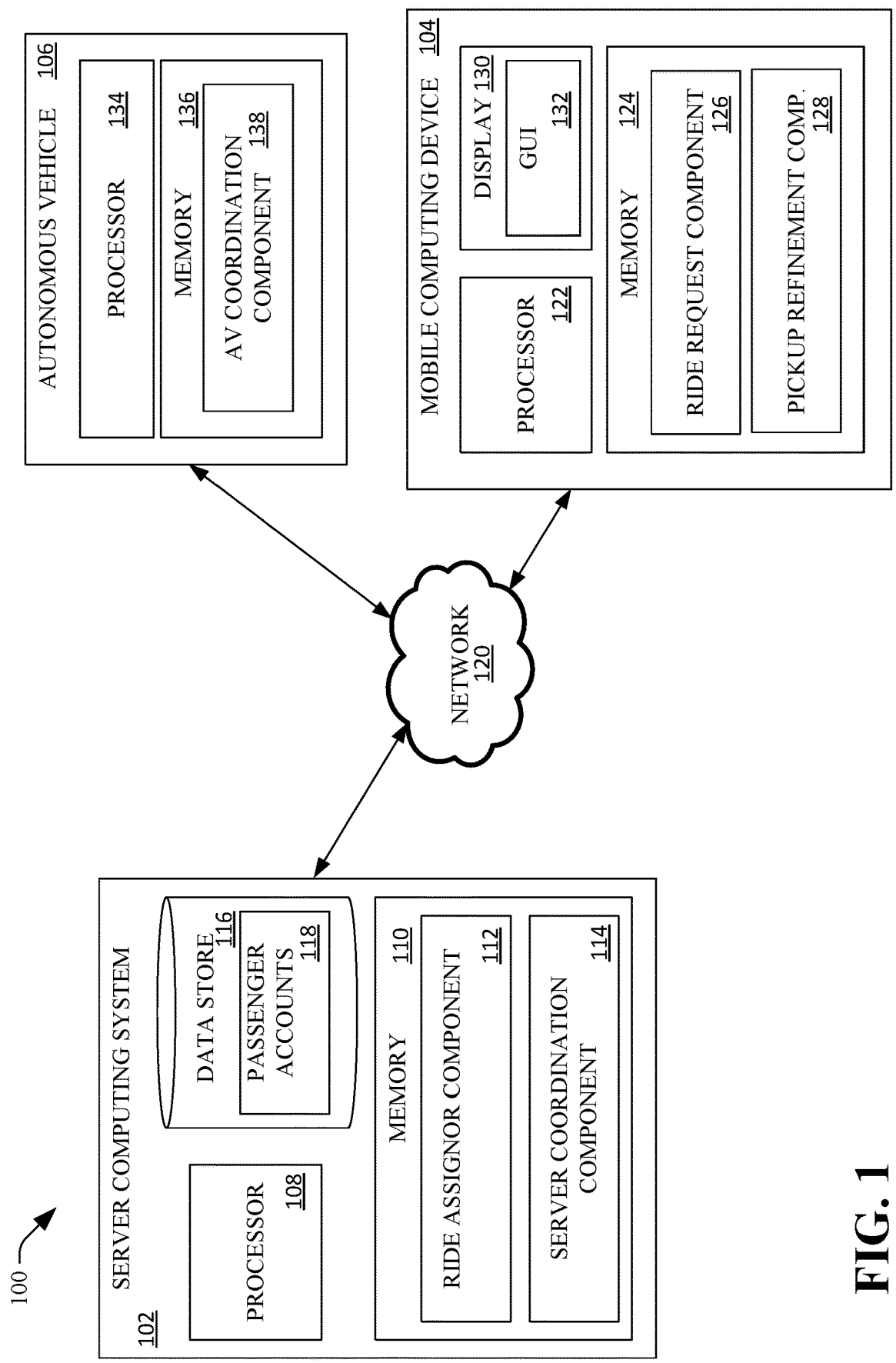
FIG. 1 is a functional block diagram of an exemplary autonomous vehicle that is configured to identify a passenger identifier of a potential passenger of the autonomous vehicle.

Various technologies pertaining to an autonomous vehicle are described herein with reference to the drawings, wherein like reference numerals are used to refer to like elements throughout. Specifically, the autonomous vehicle described herein is configured to: 1) identify a passenger identifier presented by a person; and 2) pick up the person responsive to identifying the passenger identifier. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Described herein are various technologies pertaining to autonomous vehicles. With more particularity, an autonomous vehicle described herein is configured to identify, based upon sensor signals output by sensors of the autonomous vehicle, that a person is attempting to hail the autonomous vehicle based upon a passenger identifier presented to the autonomous vehicle by the person. The autonomous vehicle, responsive to determining that the person is attempting to hail the autonomous vehicle, is further configured to navigate to a location of the person and allow the person entry into the autonomous vehicle to begin a ride. Further, information that is to be imparted to the autonomous vehicle by way of the passenger identifier may be unique to the person. Thus, for instance, the autonomous vehicle can identify the passenger identifier based upon a sensor signal output by a sensor of the autonomous vehicle, and responsive to identifying the passenger identifier, the autonomous vehicle can identify a passenger account that includes account information, where the account information may include payment information (e.g., a credit card number), travel preferences of the person, ride history of the person, etc. In another example, the person may have already requested a ride using a ride request component (e.g., a mobile application) on the person's mobile computing device. As the autonomous vehicle approaches the location of the person, the person presents the passenger identifier to the autonomous vehicle. The autonomous vehicle identifies the passenger identifier based upon sensor signal(s) output by sensor(s) of the autonomous vehicle and navigates to a location of the person responsive to identifying the passenger identifier. These and other aspects will be described in more detail below.

With reference now to FIG. 1, illustrated is a system 100 configured to detect and identify a passenger identifier used to hail an autonomous vehicle from among an autonomous vehicle fleet. The system 100 includes a server computing system 102 and a mobile computing device 104 (e.g., a smartphone, a tablet computing device, a wearable computing device, etc.), wherein the server computing system 102 is in communication with the mobile computing device 104. The system 100 further includes an autonomous vehicle 106, wherein the autonomous vehicle 106 is in communication with the server computing system 102. While not shown, the server computing system 102 can be in communication with a plurality of autonomous vehicles.

The server computing system 102 is configured to receive a ride request from the mobile computing device 104, wherein the ride request comprises an identifier for a passenger account of a person and ride information, and further wherein the ride information can include a pickup time, a pickup location, a ride destination, a number of passengers who are to be included in the ride, etc. In response to receiving the ride request, the server computing system 102 is configured to transmit a signal to the autonomous vehicle 106, wherein the signal comprises a ride instruction. The ride instruction can indicate at least some of the content of the ride request, including the ride information and a passenger identifier that is assigned to the person. The passenger identifier may be a barcode (e.g., a QR code), a pattern or a sequence of patterns, a color or a sequence of colors, a key chain (with unique shape, color, a wireless transceiver, etc.). In this example, the autonomous vehicle 106 conducts a search for the passenger identifier while the autonomous vehicle 106 travels through a search area that is proximate to the pickup location identified in the ride request.

In another example, rather than hailing the ride through use of a ride-hailing application, the person may hail an autonomous vehicle for a ride by presenting the passenger identifier in a location where the autonomous vehicle 106 can detect the passenger identifier. This may be beneficial in situations where the person decides to hail the autonomous vehicle upon initially visually seeing the autonomous vehicle, when the mobile telephone of the person does not receive service, when the battery of the mobile telephone of the person needs charged, etc. For example, the person can have a passenger account, and a passenger identifier (or identifying information encoded in a passenger identifier) can be assigned to the passenger account. In a non-limiting example, the passenger identifier can be a QR code in the form of a sticker that can be placed on the back of a mobile device, where the QR code encodes identifying information that is assigned to the passenger account. In another non-limiting example, the passenger identifier can be a keychain, where the keychain has a shape that is assigned to the passenger account, color that is assigned to the passenger account, or is configured to emit a signal (e.g., radio frequency, light pulse, sound, etc.) that comprises identifying information that is assigned to the passenger account. In such an embodiment, the person is able to present the passenger identifier to the autonomous vehicle 106 when the person is in a field of view of one or more sensors of the autonomous vehicle 106. The autonomous vehicle 106 detects, via sensor signals output by the one more sensors of the autonomous vehicle 106, the passenger identifier being presented to the autonomous vehicle 106. The autonomous vehicle 106 then determines identifying information associated with the passenger identifier (e.g., decodes information in the barcode) and transmits the identifying information to the server computing system 102. The server computing system 102 searches for a passenger account of the person based upon the identifying information and transmits an indication to the autonomous vehicle 106 that the person is an authorized passenger with a passenger account. The autonomous vehicle 106 can then pick up the person and travel to a destination indicated by the person.

In order to achieve the actions described above, the server computing system 102 can include a processor 108 and memory 110 that includes computer-executable instructions that are executed by the processor 108. The memory 110 may include a ride assignor component 112 and a server coordination component 114. The ride assignor component 112 is configured to communicate with the autonomous vehicle 106 and the mobile computing device 104 via a network 120. The server computing system 102 further comprises a data store 116 that stores passenger accounts 118. A passenger account for a person in the passenger accounts 118 comprises user information (e.g., name, contact information, payment information, saved destinations, etc.). A person can input user information for storage in the data store 116 via the mobile computing device 104.

The mobile computing device 104 comprises a processor 122 and memory 124, wherein the memory 124 includes computer-executable instructions that are executed by the processor 122. The memory 124 may include a ride request component 126 and/or pickup refinement component 128. The ride request component 126 and the pickup refinement component 128 are configured to communicate with the server computing system 102 via the network 120. The mobile computing device 104 can also include a display 130 configured to present a graphical user interface (GUI) 132 of the ride request component 126.

The autonomous vehicle 106 can include a processor 134 and memory 136 that includes computer-executable instructions that are executed by the processor 134. The memory 136 may include an AV coordination component 138 that is configured to communicate with the server computing system 102 via the network 120.

Exemplary operation of the system 100 is now set forth. In one example, the ride request component 126 is initiated at the mobile computing device 104. The ride request component 126 receives input from the person by way of the GUI 132, wherein the input comprises a ride request, which can include a pickup location, pickup time, destination location, and so forth. The ride request component 126 transmits the ride request to the ride assignor component 112 of the server computing system 102. The ride assignor component 112 searches the passenger accounts 118 for a passenger account of the person and identifies the passenger account for the person responsive to receiving the ride request. Subsequent to locating the passenger account of the person, the server coordination component 114 causes the server computing system 102 to transmit information in the ride request to the autonomous vehicle 106.

The AV coordination component 138 receives the information in the ride request, and in response to receiving such information, the AV coordination component 138 determines a route toward the pickup location of the person. In another example, the server coordination component 114 can determine the route and transmit the route to the autonomous vehicle 106. Responsive to the route being determined, the autonomous vehicle 106 travels along the route toward the pickup location of the person. As the autonomous vehicle 106 travels along the route, the autonomous vehicle 106 can ascertain pickup refinement information for the person. In one example, pickup refinement information can be based on strength of a wireless signal emanating from the mobile computing device 104 as the autonomous vehicle 106 moves relative to the mobile computing device 104 (e.g., as the signal strength becomes stronger, the autonomous vehicle 106 can ascertain that it is getting closer to the person). In another example, the autonomous vehicle 106 can ascertain the pickup refinement information based upon a passenger identifier being displayed on the display 130 of the mobile computing device 104. In yet another example, the autonomous vehicle 106 can ascertain the pickup refinement information based upon a passenger identifier in the form of physical object being held in the air by the person. Other examples are also contemplated.

In an embodiment, the server computing system 102 transmits identifying information (which is assigned to the passenger identifier) associated with the person to the autonomous vehicle 106. Additionally, the server computing system 102 transmits a notification to the mobile computing device 104, instructing the person to present the passenger identifier in a direction from which the autonomous vehicle 106 will be arriving. The pickup refinement component 128 then causes the passenger identifier to be presented on the display 130 (e.g., in the GUI of the ride request component 126). As the autonomous vehicle 106 continues to navigate proximate the pickup location identified in the ride request, the sensor (not shown) of the autonomous vehicle 106 scans the environment. When the autonomous vehicle 106 detects the passenger identifier based upon a sensor signal output by the sensor of the autonomous vehicle 106, the autonomous vehicle 106 ascertains identifying information based upon the passenger identifier (e.g., the autonomous vehicle 106 reads a QR code and acquires the identifying information). The autonomous vehicle 106 compares the identifying information to the identifying information received from the server computing system 102. If the two pieces of identifying information do not match, the autonomous vehicle 106 continues to search for the passenger identifier. If the two pieces of identifying information match, the autonomous vehicle 106 maneuvers towards the person presenting the passenger identifier and allows the person entry into the autonomous vehicle 106.

While the above examples pertain to ride hailing, other uses of an identifier to refine a pickup location or a dropoff location are contemplated. For example, the person may request that the autonomous vehicle 106 pick an object up at a pickup location. For instance, the person may have ordered groceries online and is requesting that the autonomous vehicle 106 retrieve the groceries from the grocery store. The autonomous vehicle 106 can determine the location of the grocery store via a GPS system; however, the pickup location for the groceries may not be the front door of the grocery. In this case, an identifier (e.g. signal, sticker, object, etc.) may be affixed at the grocery store pickup location. The identifier is detected by the autonomous vehicle 106. The autonomous vehicle 106 then determines identifying information associated with the identifier and transmits the identifying information to the server computing system 102. The server computing system 102 searches for an account of the grocery store based upon the identifying information and transmits an indication to the autonomous vehicle 106 that the autonomous vehicle is in the correct location to retrieve the groceries. The autonomous vehicle 106 can then stand by and wait for loading.

In another example, an autonomous vehicle may be dropping an object off at a dropoff location to a recipient. For instance, the person may have ordered the groceries discussed above which, once loaded into the autonomous vehicle 106, are transported to the person's house from the grocery store by the autonomous vehicle 106. In this case, an identifier (e.g. signal, sticker, object, etc.) may be affixed on the person's mailbox, house, or somewhere else on the property. The identifier is detected by the autonomous vehicle 106. The autonomous vehicle 106 then determines identifying information associated with the identifier and transmits the identifying information to the server computing system 102. The server computing system 102 searches for a passenger account of the person based upon the identifying information and transmits an indication to the autonomous vehicle 106 that the autonomous vehicle is in the correct location to deliver the groceries. The autonomous vehicle 106 can then stand by and wait for unloading.

Figure 2:
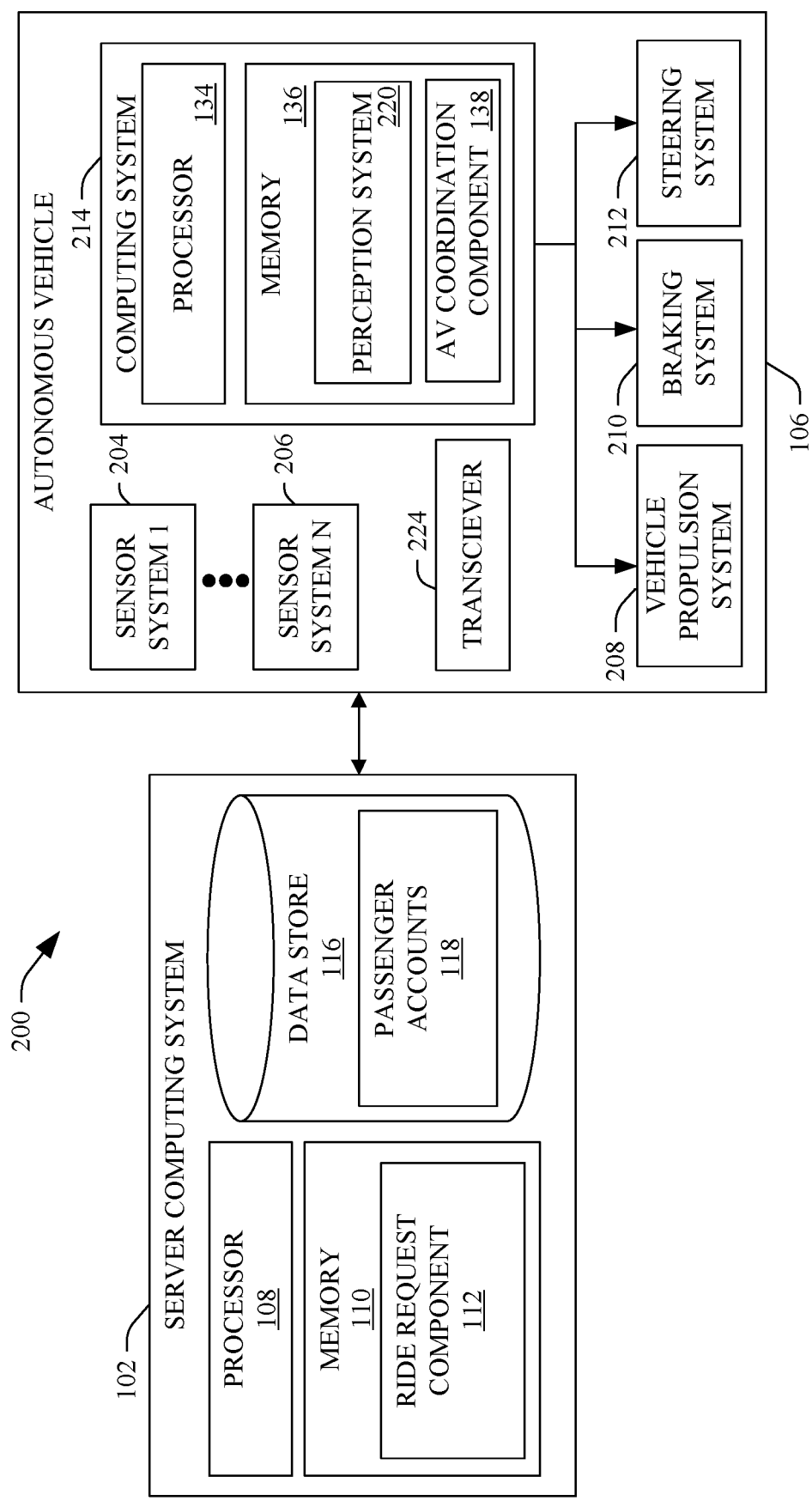
FIG. 2 is a functional block diagram of an exemplary autonomous vehicle that is in communication with a server computing system.

Now turning to FIG. 2, illustrated is another exemplary system 200 in which the autonomous vehicle 106 is hailed using a passenger identifier. The system 200 includes the server computing system 102 and the autonomous vehicle 106. The autonomous vehicle 106 includes a plurality of sensor systems, namely, a sensor system 1 204, . . . , and a sensor system N 206, where N can be substantially any integer greater than 1 (collectively referred to herein as sensor systems 204-206). The autonomous vehicle 106 can navigate about roadways without a human driver based upon sensor signals outputted by the sensor systems 204-206. The sensor systems 204-206 are of different types and are arranged about the autonomous vehicle 106. For example, the sensor system 1 204 may be a lidar sensor system and the sensor system N 206 may be a camera (image) system. Other exemplary sensor systems included in the sensor systems 204-206 can include radar sensor systems, GPS sensor systems, sonar sensor systems, infrared sensor systems, and the like.

The autonomous vehicle 106 further includes several mechanical systems that are used to effectuate appropriate motion of the autonomous vehicle 106. For instance, the mechanical systems can include, but are not limited to, a vehicle propulsion system 208, a braking system 210, and a steering system 212. The vehicle propulsion system 208 can include an electric engine, an internal combustion engine, or a combination thereof. The braking system 210 can include an engine brake, brake pads, actuators, and/or any other suitable componentry that is configured to assist in decelerating the autonomous vehicle 106. The steering system 212 includes suitable componentry that is configured to control the direction of movement of the autonomous vehicle 106.

The autonomous vehicle 106 additionally includes a computing system 214 that is in communication with the sensor systems 204-206, the vehicle propulsion system 208, the braking system 210, and the steering system 212. The computing system 214 includes the processor 134 and memory 136. Pursuant to various examples, the processor 134 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 136 of the computing system 214 includes a perception system 220 that can perceive objects within an environment of the autonomous vehicle 106. According to an example, the perception system 220 can detect a person hailing the autonomous vehicle within vicinity of the autonomous vehicle 106 based on sensor signals output by the sensor systems 204-206. When the perception system 220 detects that the person is displaying a passenger identifier, the perception system 220 outputs an indication to the server computing system 102 that the person is presenting the passenger identifier. The server computing system 102 receives such indication and is configured to: 1) ascertain whether the passenger identifier is associated with a passenger account from the passenger accounts 118 in the data store 116; and 2) identify the passenger account from among the plurality of passenger accounts.

When the server computing system 102 determines that the person has a passenger account, the server computing system 102 is configured to output an indication that the person is attempting to hail the autonomous vehicle 106 to the AV coordination component 138. The AV coordination component 138, responsive to receiving such indication, can generate control signals that are transmitted to one or more of the propulsion system 208, the braking system 210, or the steering system 212. Specifically, the AV coordination component 138 is configured to output control signal(s) to the propulsion system 208, the braking system 210, and/or the steering system 212 to cause the autonomous vehicle 106 to decrease its velocity and maneuver towards the person.

In addition, the AV coordination component 138 can plan maneuvers that are to be performed by the autonomous vehicle 106 in the environment. The AV coordination component 138 can select a maneuver to be performed based on the output of the perception system 220. Thereafter, the AV coordination component 138 can plan motion of the autonomous vehicle 106 in time and space. According to an example, when the perception system 220 detects a passenger identifier indicating a person is hailing a ride, the AV coordination component 138 can set a pickup location for the autonomous vehicle 106. Thus, the AV coordination component 138 can cause the autonomous vehicle 106 to stop in response to detecting the passenger identifier (presuming that the autonomous vehicle 106 is not already full and/or is not already in route to picking up another passenger). The autonomous vehicle 106 can also comprise a transceiver 224 that allows the autonomous vehicle 106 to communicate with the server computing system 102.

Figure 3:
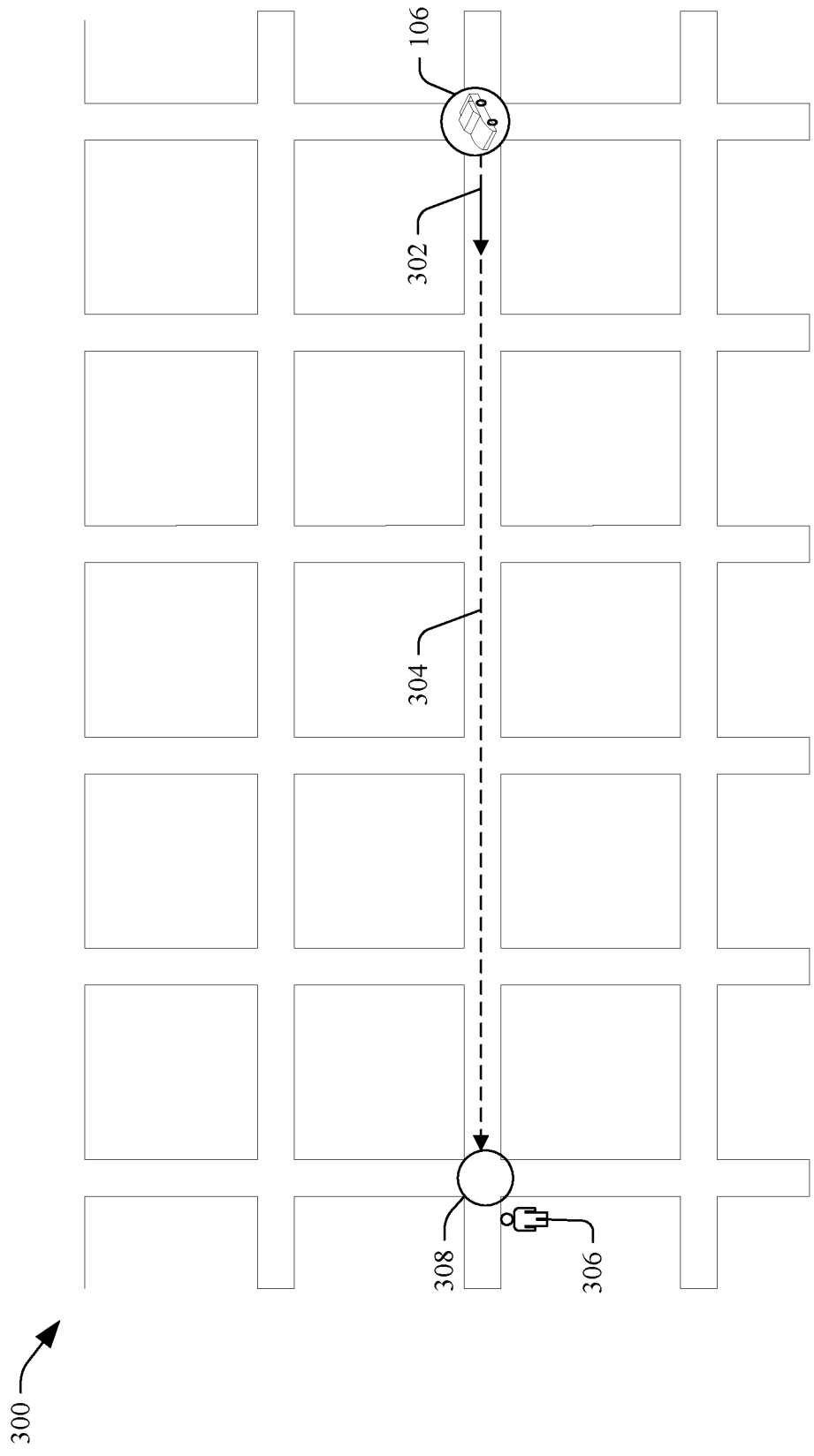
FIG. 3 is a schematic that illustrates an autonomous vehicle that is configured to identify a passenger identifier of a potential passenger of the autonomous vehicle.

Now turning to FIG. 3, an exemplary schematic 300 illustrating operation of the system 100 is illustrated. In an embodiment, the autonomous vehicle 106 travels in the direction illustrated by the arrow 302 along a roadway 304. As the autonomous vehicle 106 travels along the roadway 304, the sensor systems 204-206 generate sensor signals that indicate existence of objects in the surroundings of the autonomous vehicle 106. The perception system 220 receives the sensor signals output by the sensor systems 204-206 and detects a person 306 based upon at least one of the sensor signals output by at least one of the sensor systems 204-206.

The computing system 214 can then ascertain that the person 306 is potentially hailing the autonomous vehicle 106 for a ride. The AV coordination component 128 can identify a passenger identifier being presented by the person 306. For instance, the AV coordination component 138 can identify that a keychain is raised in the air, wherein the AV coordination component 138 further determines that the keychain is of a type used as a passenger identifier. The computing system 214 additionally has access to a detailed map of the geographic region and can ascertain that the person 306 is standing in the roadway or very close to the roadway (e.g., on the curb) based upon a sensor signal output by the sensor systems 204-206. Based upon the position of the person 306 relative to the roadway 204, the AV coordination component 138 can determine that the person 306 may be attempting to hail the autonomous vehicle 106.

The AV coordination component 138 can ascertain identifying information based upon the passenger identifier and can cause the computing system 214 to transmit the identifying information to the server computing system 102. For example, the passenger identifier may be a barcode, and the identifying information can be encoded in the barcode. The AV coordination component 138 receives sensor signals output by the sensor systems 204-206, recognizes that the person 306 is holding up the barcode in the air (on a mobile device, printed on paper, etc.), and reads the barcode to acquire the identifying information. In another example, the passenger identifier may be a screen of a particular color; in such example, the AV coordination component 138 recognizes the color as shown on the display 130 of the mobile computing device 104 (being held up by the person 306) and navigates towards the person 306. As the autonomous vehicle 106 approaches the person 306, the mobile computing device 104 can transmit the identifying information (by way of a suitable wireless protocol) to the autonomous vehicle 106.

The server computing system 102 receives the identifying information from the autonomous vehicle 106 and compares the identifying information to identifying information assigned to passenger accounts 118 in the data store 116. If the received identifying information is assigned to a passenger account, the server computing system 102 transmits an indication to the autonomous vehicle 106 that the person 306 is to be picked up. If the identifying information is not assigned to a passenger account, the server computing system 102 transmits an indication to the autonomous vehicle 106 that the person 306 is not to be picked up. In an alternative embodiment, the autonomous vehicle 106 can pick up the person 306 when the person does not have account; in such an embodiment, the autonomous vehicle 106 can include data entry interfaces that allow the person 306 to set up an account. Once the person 306 has set up the account, the autonomous vehicle 106 can navigate to a destination expressed by the person 306.

The scenario set forth above relates to when the person 306 has not employed the ride request component 126 to hail the autonomous vehicle 106, but instead has hailed the autonomous vehicle 106 through use of the passenger identifier. In a different embodiment, the person 306 may employ the ride request component 126 to hail the autonomous vehicle 106, and the person 306 may utilize the passenger identifier to assist the autonomous vehicle 106 with disambiguating the person 306 from amongst other people that may be in the area and/or refine the pickup location 308 when the pickup location 308 provided in the ride request is ambiguous and/or relatively large. This embodiment may be particularly useful in situations where there are numerous people in an area, and further where the location of the person 306 (as known to the autonomous vehicle 106) is imprecise.

The server computing system 102, in response to receiving a ride request by way of the ride request component 126, can transmit an instruction to the mobile computing device 104 of the person 306 who requested the ride to present a passenger identifier to the autonomous vehicle 106 to aid the autonomous vehicle 106 in refining the pickup location 308 and/or disambiguating between the person 306 and some other person. In addition, the server computing system 102 can transmit identifying information to the autonomous vehicle 106, wherein the identifying information is assigned to a passenger account of the person 306. The computing system 214 receives the sensor signals output by the sensor systems 204-206 and detects a passenger identifier based upon at least one of the sensor signals output by at least one of the sensor systems 204-206. For instance, the computing system 214 can identify that a QR code is being presented, or a pattern is being presented, or a color is being presented, or a keychain is raised in the air. The AV coordination component 138 can ascertain identifying information based upon the passenger identifier and can compare the identifying information with the identifying information previously received from the server computing system 102. When the identifying information received from the server computing system 102 and the identifying information ascertained based upon the passenger identifier match, the AV coordination component 138 can navigate to the person 306 to pick up such person. When the identifying information received from the server computing system 102 and the identifying information ascertained based upon the passenger identifier do not match, the autonomous vehicle 106 can continue scanning the environment for the passenger identifier for the person 306.

Responsive to determining that the person 306 is allowable to be picked up, the computing system 214 can output control signals to the propulsion system 208, the braking system 210, and/or the steering system 212. For instance, the computing system 214 can output a control signal to the propulsion system 208 that causes the propulsion system 208 to decrease the velocity of the autonomous vehicle 106. Further, the computing system 214 can output a control signal to the steering system 212 to (slightly) modify the direction of travel of the autonomous vehicle 106. For instance, the computing system 214 can cause the steering system 212 to direct the autonomous vehicle 106 towards the person 306, thereby signaling to the person that the autonomous vehicle 106 is intending to pick up the person 306.

While the examples set forth above have been provided in the context of an autonomous vehicle, it is to be understood that the technologies described herein are also well-suited for use in conventional taxis and ride-sharing vehicles (driven by humans). For instance, a vehicle driven by a human can include at least one of the sensor systems 204-206 and the server computing system 102, and the server computing system 102 can identify that the person 306 is requesting a ride and further identify the passenger identifier being presented by the person 306.

FIGS. 4-7 illustrate exemplary methodologies relating to hailing a ride and/or refining a pickup location. While the methodologies are shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. As used herein, the term "computer-readable medium" does not encompass a propagated signal.

Figure 4:
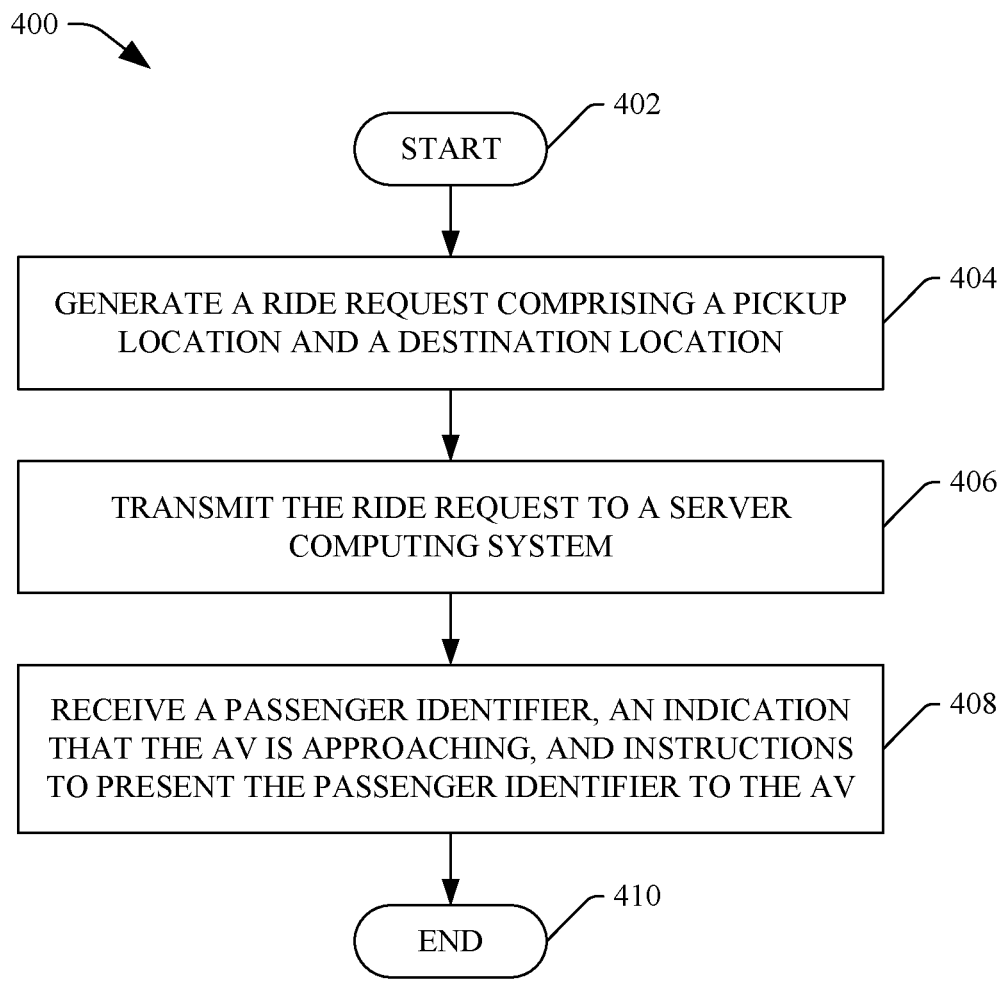
FIG. 4 is a flow diagram that illustrates an exemplary methodology for requesting a ride from an autonomous vehicle, wherein the methodology is performed by a mobile computing device.

With reference now to FIG. 4, an exemplary methodology 400 performed by a mobile computing device is illustrated. The methodology 400 starts at 402, and at 404 a ride request is generated, wherein the ride request includes an identifier for a person requesting the ride, a pickup location, and a destination location. For example, the mobile computing device can input at a graphical user interface, wherein the input indicates that the person is requesting a ride from an autonomous vehicle. At 406, the mobile computing device transmits the ride request to a server computing system that is in network communication with the mobile computing device and an autonomous vehicle. The server computing system processes the ride request and transmits ride information to an autonomous vehicle that is available to pick up the person at the pickup location identified in the ride request. The mobile computing device can confirmation that the ride request has been accepted by the server computing system.

At 408, the mobile computing device receives a passenger identifier and an indication that the autonomous vehicle is approaching the pickup location from the server computing system. The indication that the autonomous vehicle is approaching the pickup location can comprise information indicating a direction from which the autonomous vehicle is approaching the person so that the person knows what direction to present the passenger identifier. The mobile computing device prompts the person to present the passenger identifier to the autonomous vehicle to aid the autonomous vehicle in refining the pickup location. For example, if the pickup location is a basketball arena, the locations a person could be within that location are numerous, and the density of people around the arena may make it difficult for the autonomous vehicle to identify the person from amongst the crowd. In such example, the mobile computing device may have received a passenger identifier in the form of a barcode from the server computing system as well as an indication that the autonomous vehicle is approaching and that it is approaching from the East. Therefore, the mobile computing device can instruct the person to lift the mobile computing device up and toward the East such that the autonomous vehicle's sensor systems can readily ascertain the passenger identifier, in this case a bar code, from among the busy arena environment. When the autonomous vehicle recognizes the passenger identifier, the mobile computing device indicates to the person that the autonomous vehicle has arrived, and the person may get into the autonomous vehicle. The methodology 400 completes at 410.

Figure 5:
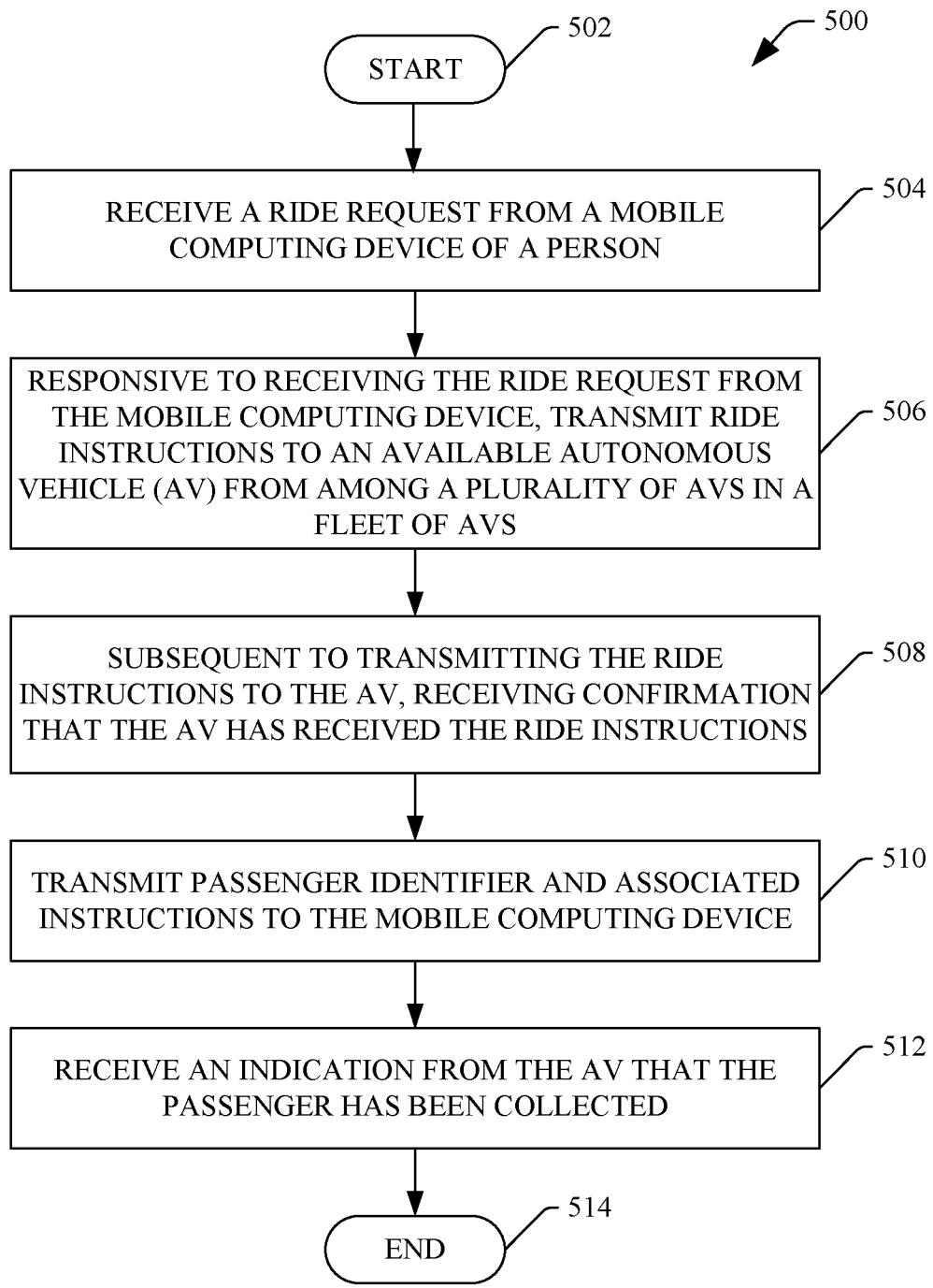
FIG. 5 is a flow diagram that illustrates an exemplary methodology for processing a ride request received from a mobile computing device, wherein the methodology is performed by a server computing system.

With reference now to FIG. 5, an exemplary methodology 500 performed by a server computing system is illustrated, wherein the server computing system is configured to instruct an autonomous vehicle to pickup a person and transport the person to a desired destination of the person. The methodology 500 starts at 502, and at 504 the computing system receives a ride request from a mobile computing device, wherein the ride request comprises an identifier of the person, a pickup location, and a destination. At 506, the server computing system transmits ride instructions to an available autonomous vehicle from among a fleet of autonomous vehicles that are in network communication with the server computing system. The ride instructions can include, for instance, identifying information for the person (which is assigned to a passenger identifier), a pickup location, a pickup time, a destination location, etc. The server computing system can identify the autonomous vehicle based upon preferences in a passenger account of the person, based upon a number of riders indicated in the ride request, etc.

At 508, the server computing system receives confirmation from the autonomous vehicle that the ride instructions have been received. At 510, the server computing system transmits a passenger identifier (e.g., a barcode, a color, a pattern, etc.) to the mobile computing device if the mobile computing device does not already have the passenger identifier. In addition, the server computing system can transmit instructions to the mobile computing device, wherein the instructions indicate when the person is to present the passenger identifier and a direction that the passenger identifier is to be presented. At 512, the server computing system receives an indication that the autonomous vehicle has successfully located the passenger and the ride has begun. The methodology 500 completes at 514.

Figure 6:
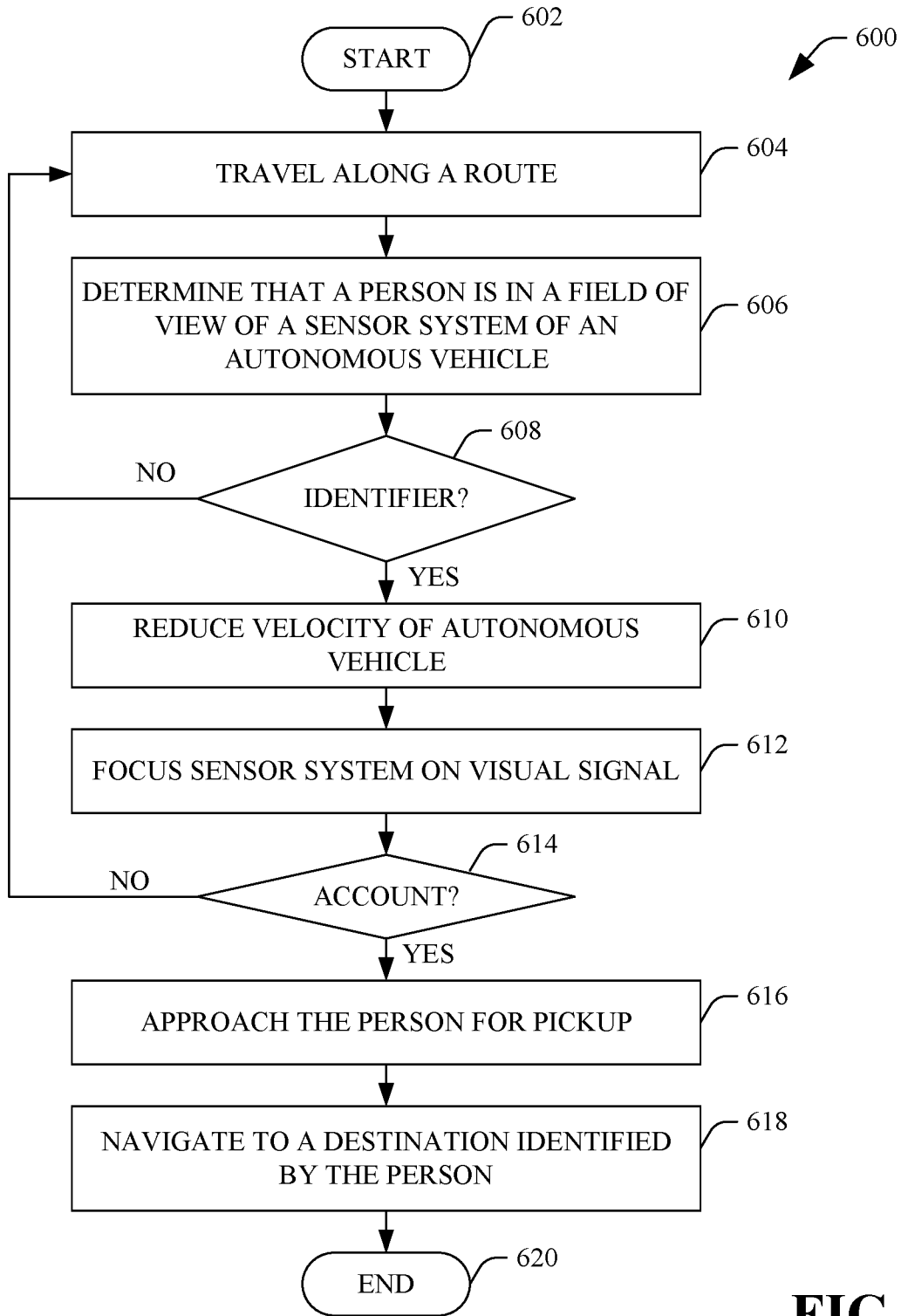
FIG. 6 is a flow diagram illustrating an exemplary methodology for controlling operation of an autonomous vehicle based upon identification of a passenger identifier set forth by a potential passenger of the autonomous vehicle.

With reference now to FIG. 6, an exemplary methodology 600 performed by an autonomous vehicle is illustrated. The methodology 600 starts at 602, and at 604 the autonomous vehicle travels along a route. For instance, the autonomous vehicle can travel in a geographic region along a road, searching for a person to pick up. The autonomous vehicle can be caused to travel in the geographic region based upon collective knowledge submitted by a fleet of autonomous vehicles, such that the autonomous vehicle is likely to have a person hail the autonomous vehicle when travelling in the geographic region (e.g. by a sports arena near the end of a sporting event, by a concert hall near the end of a concert, by a school near the end of the school day, etc.). At 606, the autonomous vehicle determines that a person is in a field of view of a sensor system of the autonomous vehicle based upon a sensor signal output by the sensor system. At 608, a determination is made as to whether the person is presenting a passenger identifier. If it is ascertained that the person is not presenting a passenger identifier to hail the autonomous vehicle, then the methodology returns to 604.

If it is ascertained at 608 that the person is presenting a passenger identifier to hail the autonomous vehicle, then at 610 the velocity of the autonomous vehicle is reduced, thereby providing the autonomous vehicle additional time to identify (and optionally decode) the passenger identifier being presented by the person. At 612, a sensor system is focused on the passenger identifier. At 614, a determination is made as to whether the passenger identifier is associated with a passenger account. If it is determined at 614 that the passenger identifier is not associated with a passenger account (e.g., the person does not have an account), the methodology returns to 604. If at 614 it is determined that the passenger identifier is associated with an account, then at 616 the autonomous vehicle approaches the person to pick up the person. At 618, the autonomous vehicle navigates to a destination identified by the person. The methodology 600 completes at 620.

Figure 7:
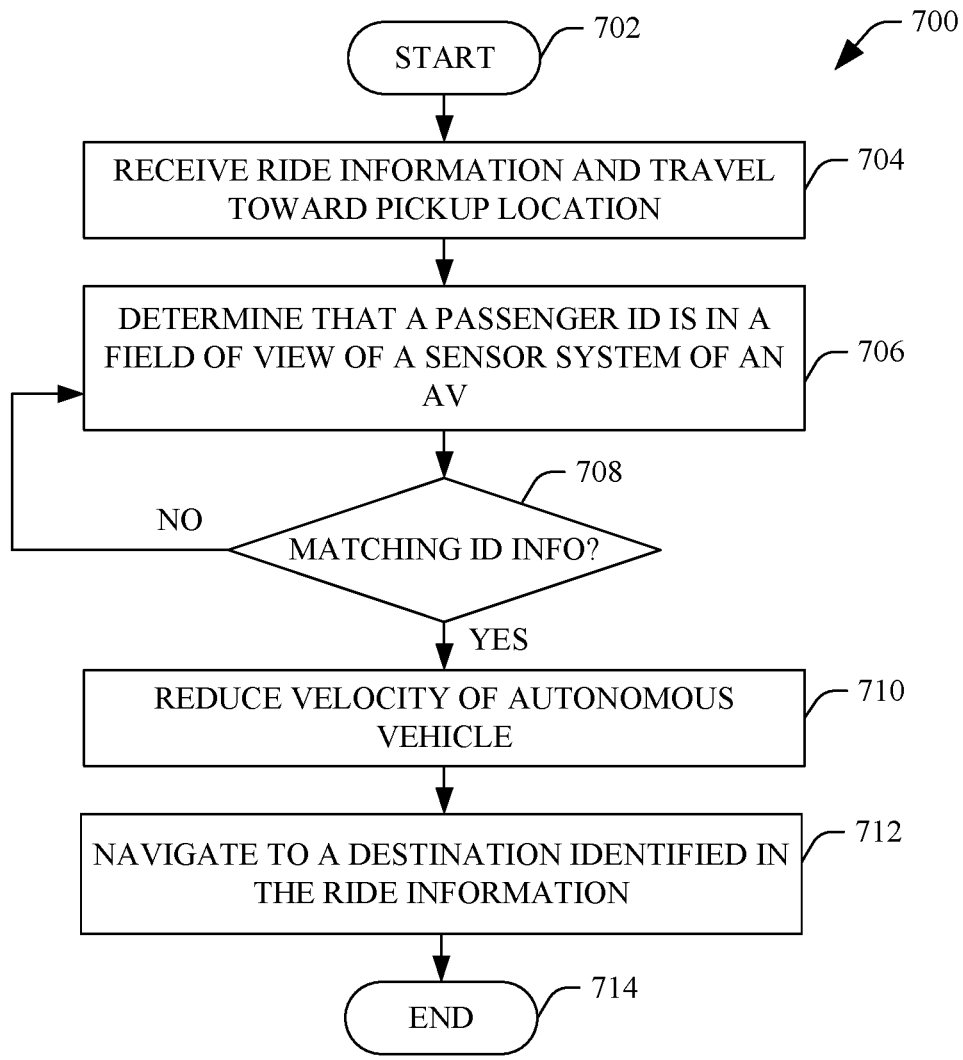
FIG. 7 is a flow diagram illustrating an exemplary methodology performed by an autonomous vehicle for refining a pickup location of a passenger.

With reference now to FIG. 7, a flow diagram illustrating an exemplary methodology 700 performed by an autonomous vehicle is illustrated. The methodology 700 starts at 702, and at 704 the autonomous vehicle receives ride information for a person and travels towards a pickup location to retrieve the person. In an example, the ride information can include identifying information associated with the person, such that, as the autonomous vehicle approaches the pickup location, the autonomous vehicle can scan the environment using sensor systems to detect a passenger identifier that encodes the identifying information (for example a barcode) associated with the person. At 706, the autonomous vehicle determines that a passenger identifier is in a field of view of a sensor system of the autonomous vehicle.

At 708, a determination is made as to whether the identifying information encoded in the passenger identifier (e.g., barcode) matches the identifying information associated with the passenger account of the person that was included in the ride information. If it is ascertained at 708 that the identifying information in the barcode does not match identifying information associated with the passenger account of the person, then the methodology 700 returns to 706. If at 708 it is determined that the identifying information encoded in the barcode does match the identifying information associated with the passenger account of the person, then the methodology 700 proceeds to 710, where the autonomous vehicle begins to reduce its velocity, maneuvers towards the person, and picks up the person. At 712, the autonomous vehicle navigates to a destination included in the ride information received at 704. The methodology 700 completes at 714.

Figure 8:
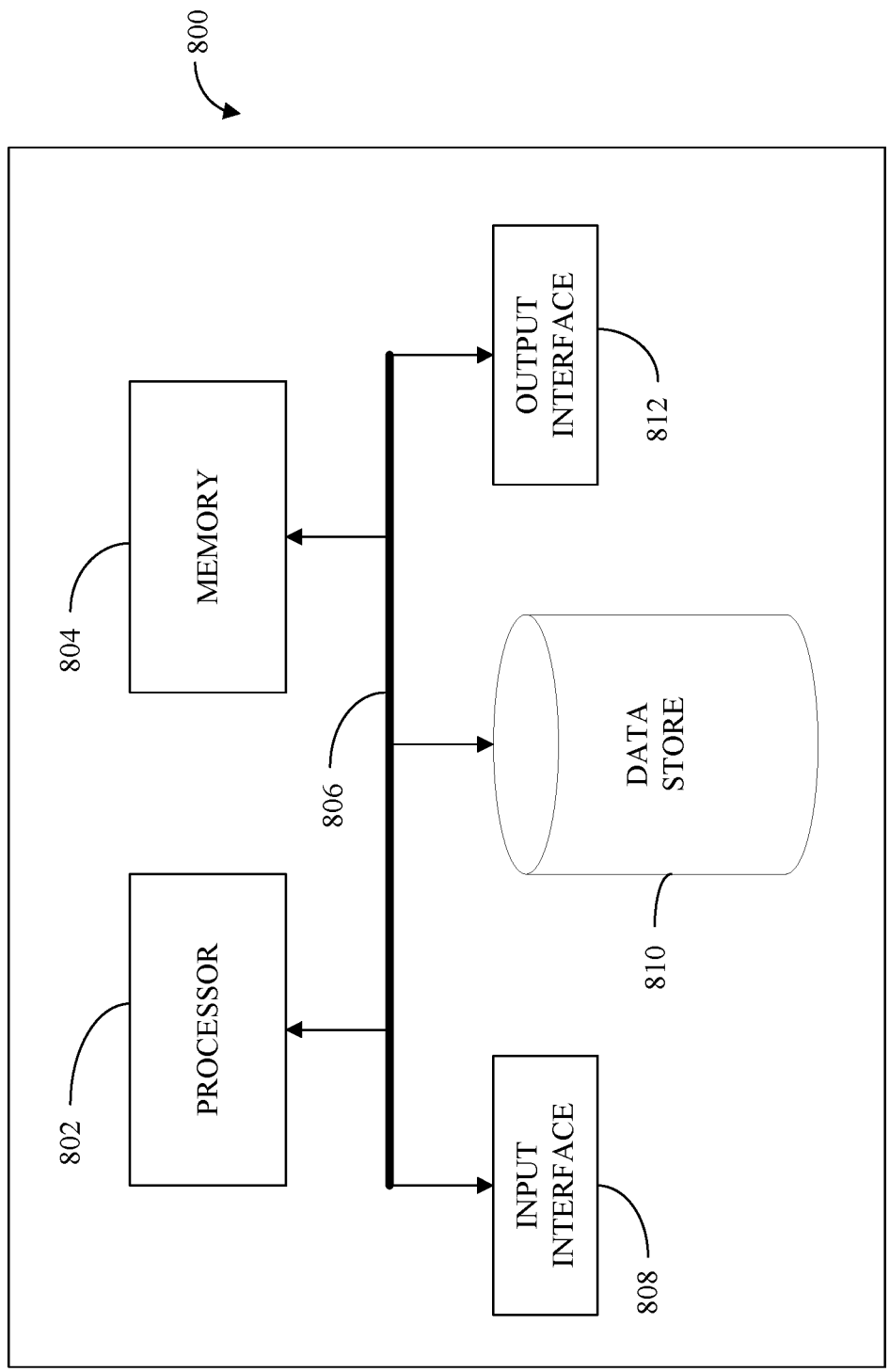
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be included in the server computing system 102, the mobile computing device 104, or the autonomous vehicle 106. The computing device 800 includes at least one processor 802 that executes instructions that are stored in a memory 804. The instructions may be, for instance, instructions for implementing functionality described as being carried out by one or more systems discussed above or instructions for implementing one or more of the methods described above. The processor 802 may be a GPU, a plurality of GPUs, a multi-core processor, etc. The processor 802 may access the memory 804 by way of a system bus 806. In addition to storing executable instructions, the memory 804 may also store passenger identifiers, passenger accounts, travel characteristics, etc.

The computing device 800 additionally includes a data store 810 that is accessible by the processor 802 by way of the system bus 806. The data store 810 may include executable instructions, sensor data, passenger accounts, etc. The computing device 800 also includes an input interface 808 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the vehicle propulsion system 208, the steering system 212, and/or the braking system 210 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and BLU-RAY DISC (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle, comprising:
a sensor;
a processor; and
memory that stores computer-executable instructions that, when executed by the processor, cause the processor to perform acts comprising:
receiving a sensor signal from the sensor;
determining, based on the sensor signal, that a visual passenger identifier is being presented by a mobile computing device of a person in a field of view of the sensor, wherein the mobile computing device comprises the visual passenger identifier, wherein the visual passenger identifier is presented by the person to hail the autonomous vehicle while a battery of the mobile computing device is discharged such that the battery is completely depleted;
determining identifying information based on the visual passenger identifier;
subsequent to determining the identifying information, transmitting the identifying information to a server computing system in network communication with the autonomous vehicle, wherein the server computing system searches over passenger accounts in a data store for a passenger account associated with the identifying information;
receiving an indication from the server computing system as to whether the identifying information is associated with the passenger account; and
responsive to determining the identifying information, causing the autonomous vehicle to navigate towards a location of the visual passenger identifier to pick up the person when the indication from the server computing system specifies that the identifying information is not associated with the passenger account.

2. The autonomous vehicle of claim 1, wherein the visual passenger identifier is affixed to a back of the mobile computing device of the person, and wherein the back of the mobile computing device of the person is presented by the person in the field of view of the sensor.

3. The autonomous vehicle of claim 1, wherein the visual passenger identifier is one of a barcode or a QR code.

4. The autonomous vehicle of claim 1, the acts further comprising:
subsequent to picking up the person, receiving information to set up a new passenger account for the person via a data entry interface of the autonomous vehicle; and causing the autonomous vehicle to navigate to a destination set by the person responsive to the new passenger account being set up for the person via the data entry interface.

5. The autonomous vehicle of claim 1, wherein the autonomous vehicle is caused to navigate past the location of the visual passenger identifier when the indication from the server computing system specifies that the identifying information is not associated with any of the passenger accounts in the data store.

6. The autonomous vehicle of claim 1, wherein the visual passenger identifier encodes the identifying information for the person requesting a ride in the autonomous vehicle.

7. The autonomous vehicle of claim 1, the acts further comprising:
receiving a ride instruction from a server computing system in communication with the autonomous vehicle, wherein the ride instruction comprises data specifying a pickup location and received identifying information, wherein the autonomous vehicle is caused to navigate towards the location of the visual passenger identifier responsive to the identifying information determined based on the visual passenger identifier matching the received identifying information.

8. The autonomous vehicle of claim 1, wherein the autonomous vehicle is hailed by presenting the visual passenger identifier without a ride request being sent via a ride-hailing application.

9. A method of controlling operation of an autonomous vehicle, comprising:
receiving a sensor signal from a sensor of the autonomous vehicle;
determining, based on the sensor signal, that a visual passenger identifier is being presented by a mobile computing device of a person in a field of view of the sensor, wherein the mobile computing device comprises the visual passenger identifier, wherein the visual passenger identifier is presented by the person to hail the autonomous vehicle while the mobile computing device lacks wireless communication service;
determining identifying information based on the visual passenger identifier;
subsequent to determining the identifying information, transmitting the identifying information to a server computing system in network communication with the autonomous vehicle, wherein the server computing system searches over passenger accounts in a data store for a passenger account associated with the identifying information;
receiving an indication from the server computing system as to whether the identifying information is associated with the passenger account; and
responsive to determining the identifying information, causing the autonomous vehicle to navigate towards a location of the visual passenger identifier to pick up the person when the indication from the server computing system specifies that the identifying information is not associated with the passenger account.

10. The method of claim 9, further comprising:
subsequent to picking up the person, receiving information to set up a new passenger account for the person via a data entry interface of the autonomous vehicle; and causing the autonomous vehicle to navigate to a destination set by the person responsive to the new passenger account being set up for the person via the data entry interface.

11. The method of claim 9, further comprising:
receiving a ride instruction from a server computing system in communication with the autonomous vehicle, wherein the ride instruction comprises data specifying a pickup location and received identifying information, wherein the autonomous vehicle is caused to navigate towards the location of the visual passenger identifier responsive to the identifying information determined based on the visual passenger identifier matching the received identifying information.

12. The method of claim 9, wherein the autonomous vehicle is hailed by presenting the visual passenger identifier without a ride request being sent via a ride-hailing application.

13. An autonomous vehicle, comprising:
a sensor;
a data entry interface;
a processor; and
memory that stores computer-executable instructions that, when executed by the processor, cause the processor to perform acts comprising:
receiving a sensor signal from the sensor;
determining, based on the sensor signal, that a visual passenger identifier is being presented by a mobile computing device of a person in a field of view of the sensor, wherein the mobile computing device comprises the visual passenger identifier;
determining identifying information based on the visual passenger identifier;
subsequent to determining the identifying information, transmitting the identifying information to a server computing system in network communication with the autonomous vehicle, wherein the server computing system searches over passenger accounts in a data store for a passenger account associated with the identifying information;
receiving an indication from the server computing system specifying that the identifying information is not associated with any of the passenger accounts in the data store;
causing the autonomous vehicle to navigate towards a location of the visual passenger identifier to pick up the person;
subsequent to picking up the person, receiving information to set up a new passenger account for the person via the data entry interface; and
causing the autonomous vehicle to navigate to a destination set by the person responsive to the new passenger account being set up for the person via the data entry interface.

14. The autonomous vehicle of claim 13, wherein the visual passenger identifier is presented by the person to hail the autonomous vehicle while a battery of the mobile computing device is discharged such that the battery is completely depleted.

15. The autonomous vehicle of claim 13, wherein the visual passenger identifier is presented by the person to hail the autonomous vehicle while the mobile computing device lacks wireless communication service.

* * * * *